(12) United States Patent
Kook et al.

(10) Patent No.: US 10,400,863 B2
(45) Date of Patent: Sep. 3, 2019

(54) PLANETARY GEAR TRAIN OF AN AUTOMATIC TRANSMISSION FOR VEHICLES

(71) Applicant: HYUNDAI MOTOR COMPANY, Seoul (KR)

(72) Inventors: Jae Chang Kook, Hwaseong-si (KR); Seong Wook Hwang, Gunpo-si (KR); Woo Jin Chang, Suwon-si (KR); Wonmin Cho, Hwaseong-si (KR); Hyun Sik Kwon, Seoul (KR); Wookjin Jang, Yongin-si (KR); Seongwook Ji, Gunpo-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 496 days.

(21) Appl. No.: 15/378,905

(22) Filed: Dec. 14, 2016

(65) Prior Publication Data

US 2017/0268632 A1  Sep. 21, 2017

(30) Foreign Application Priority Data

Mar. 16, 2016  (KR) .................. 10-2016-0031455

(51) Int. Cl.
*F16H 3/66* (2006.01)
(52) U.S. Cl.
CPC ....... *F16H 3/66* (2013.01); *F16H 2200/0069* (2013.01); *F16H 2200/2012* (2013.01); *F16H 2200/2046* (2013.01)

(58) Field of Classification Search
CPC .............. F16H 3/66; F16H 2200/2046; F16H 2200/0069; F16H 2200/2012
See application file for complete search history.

(56) References Cited

U.S. PATENT DOCUMENTS

| | | | |
|---|---|---|---|
| 9,151,363 B2 | 10/2015 | Fellmann et al. | |
| 2009/0054196 A1* | 2/2009 | Phillips ................ | F16H 3/66 475/276 |
| 2011/0045940 A1* | 2/2011 | Gumpoltsberger ...... | F16H 3/66 475/275 |
| 2011/0045941 A1* | 2/2011 | Gumpoltsberger ...... | F16H 3/66 475/275 |
| 2011/0045942 A1* | 2/2011 | Gumpoltsberger ...... | F16H 3/66 475/275 |
| 2012/0231917 A1* | 9/2012 | Phillips ................ | F16H 3/66 475/276 |
| 2013/0203550 A1* | 8/2013 | Mellet ................. | F16H 3/66 475/276 |
| 2015/0119188 A1* | 4/2015 | Beck ................... | F16H 3/66 475/276 |

FOREIGN PATENT DOCUMENTS

| | | |
|---|---|---|
| JP | 201594368 | 5/2015 |
| JP | 2015183793 | 10/2015 |
| KR | 101509726 B1 | 4/2015 |

* cited by examiner

*Primary Examiner* — David J Hlavka
(74) *Attorney, Agent, or Firm* — Lempia Summerfield Katz LLC

(57) ABSTRACT

A planetary gear train of an automatic transmission for a vehicle may include an input shaft receiving torque of an engine, an output shaft outputting torque, four planetary gear sets, and eight shafts.

8 Claims, 2 Drawing Sheets

FIG. 2

| Speed element | Control element | | | | | | Gear ratio |
|---|---|---|---|---|---|---|---|
| | B1 | B2 | C1 | C2 | C3 | C4 | |
| D1 | | ● | | ● | | ● | 5.000 |
| D2 | ● | ● | | ● | | | 3.214 |
| D3 | ● | ● | | | | ● | 2.368 |
| D4 | ○ | ● | ● | | | | 1.838 |
| (D4) | | ● | ● | ○ | | | 1.833 |
| (D4) | | ● | ● | | ○ | | 1.833 |
| (D4) | | ● | ● | | | ○ | 1.833 |
| D5 | ● | | ● | | | ● | 1.413 |
| D6 | ● | | ● | ● | | | 1.171 |
| D7 | | | ● | ○ | ● | ● | 1.000 |
| (D7) | | | ● | ● | ● | ○ | 1.000 |
| (D7) | | | ○ | ● | ● | ● | 1.000 |
| (D7) | | | ● | ● | ○ | ● | 1.000 |
| D8 | ● | | ● | | ● | | 0.798 |
| D9 | ● | | | ● | ● | | 0.643 |
| D10 | ● | | | | ● | ● | 0.600 |
| REV | | ● | | | ● | ● | -5.000 |

PLANETARY GEAR TRAIN OF AN AUTOMATIC TRANSMISSION FOR VEHICLES

CROSS-REFERENCE TO RELATED APPLICATION

This application claims priority to and the benefit of Korean Patent Application No. 10-2016-0031455 filed in the Korean Intellectual Property Office on Mar. 16, 2016, the entire contents of which are incorporated herein by reference.

BACKGROUND (a) Field of the Disclosure

The present disclosure relates to an automatic transmission for a vehicle. More particularly, the present disclosure relates to a planetary gear train of an automatic transmission for a vehicle.

(b) Description of the Related Art

Generally, an automatic transmission achieving more speed stages has been developed to enhance fuel economy and optimize drivability. Increases in oil prices may make enhancing fuel consumption of a vehicle important.

Therefore, research into reducing weight and enhancing fuel economy through downsizing of an engine and for securing drivability and fuel economy through multiple speed stages of automatic transmissions has been conducted.

However, in an automatic transmission, as the number of speed stages increases, the number of internal components (particularly, planetary gear sets) increases. As a result, the lengh of the transmission increases. Therefore, mountability, cost, weight, transmission efficiency, and the like may deteriorate.

In recent years, 8-speed automatic transmissions have been implemented. Research and development of a planetary gear train capable of implementing more speed stages has also been actively conducted.

However, a conventional 8-speed automatic transmission typically includes three to four planetary gear sets and five to seven control elements (frictional elements). In this case, since the length of the automatic transmission increases, mountability may deteriorate.

In recent years, a planetary gear train may be orientated where one planetary gear set is disposed above another planetary gear set, but structures of automatic transmissions in which parallel planetary gear sets are applied are very limited.

In another instance, dog clutches are used, instead of control elements of a wet-type. In this instance, however, shift feel can deteriorate.

The above information disclosed in this Background section is only to enhance the understanding of the background of the disclosure and therefore the background may contain information that is not prior art that is already known to a person of ordinary skill in the art.

SUMMARY

The present disclosure is directed to a planetary gear train for an automatic transmission for a vehicle. The planetary gear train has the advantages of improving power delivery, performance, and fuel economy by achieving at least ten forward speed stages and one reverse speed stage.

A planetary gear train of an automatic transmission for a vehicle according to an embodiment of the present disclosure may include: an input shaft receiving torque of an engine; an output shaft outputting torque; a first planetary gear set including first, second, and third rotational elements; a second planetary gear set including fourth, fifth, and sixth rotational elements; a third planetary gear set including seventh, eighth, and ninth rotational elements; a fourth planetary gear set including tenth, eleventh, and twelfth rotational elements; a first shaft connecting the first rotational element and the fourth rotational element; a second shaft connected with the second rotational element and connected with the input shaft; a third shaft connecting the third rotational element with the fifth rotational element; a fourth shaft connected with the sixth rotational element; a fifth shaft connecting the seventh rotational element with the tenth rotational element and selectively connected with the third shaft and the fourth shaft; a sixth shaft connecting the eighth rotational element with the twelfth rotational element and connected with the output shaft; a seventh shaft connected with the ninth rotational element and selectively connected with the third shaft; and an eighth shaft connected with the eleventh rotational element and selectively connected with the second shaft.

Each of the first shaft and the seventh shaft may be selectively connectable to a transmission housing.

The first, second, and third rotational elements of the first planetary gear set may be a first sun gear, a first planet carrier, and a first ring gear. The fourth, fifth, and sixth rotational elements of the second planetary gear set may be a second sun gear, a second planet carrier, and a second ring gear. The seventh, eighth, and ninth rotational elements of the third planetary gear set may be a third sun gear, a third planet carrier, and a third ring gear. The tenth, eleventh, and twelfth rotational elements of the fourth planetary gear set may be a fourth sun gear, a fourth planet carrier, and a fourth ring gear, respectively.

The planetary gear train may further include: a first clutch selectively connecting the second shaft with the eighth shaft, a second clutch selectively connecting the third shaft with the fifth shaft, a third clutch selectively connecting the third shaft with the seventh shaft, a fourth clutch selectively connecting the fourth shaft with the fifth shaft, a first brake selectively connecting the first shaft to the transmission housing, and a second brake selectively connecting the seventh shaft to the transmission housing.

A planetary gear train of an automatic transmission for a vehicle according to an embodiment of the present disclosure may include: an input shaft receiving torque from an engine, an output shaft outputting torque; a first planetary gear set including first, second, and third rotational elements; a second planetary gear set including fourth, fifth, and sixth rotational elements; a third planetary gear set including seventh, eighth, and ninth rotational elements; and a fourth planetary gear set including tenth, eleventh, and twelfth rotational elements. The input shaft may be connected to the second rotational element, the output shaft may be connected to the twelfth rotational element, the first rotational element may be connected with the fourth rotational element, the third rotational element may be connected with the fifth rotational element, the seventh rotational element may be connected with the tenth rotational element and is selectively connected with the fifth rotational element and the sixth rotational element, the eighth rotational element may be connected with the twelfth rotational element, the ninth rotational element may be selectively connected with the fifth rotational element, and the eleventh rotational element may be selectively connected with the second rotational element.

Each of the first rotational element and the ninth rotational element may be selectively connectable to a transmission housing.

The first, second, and third rotational elements of the first planetary gear set may be a first sun gear, a first planet carrier, and a first ring gear, the fourth, fifth, and sixth rotational elements of the second planetary gear set may be a second sun gear, a second planet carrier, and a second ring gear, the seventh, eighth, and ninth rotational elements of the third planetary gear set may be a third sun gear, a third planet carrier, and a third ring gear, and the tenth, eleventh, and twelfth rotational elements of the fourth planetary gear set may be a fourth sun gear, a fourth planet carrier, and a fourth ring gear, respectively.

The planetary gear train may further include: a first clutch selectively connecting the second rotational element with the eleventh rotational element, a second clutch selectively connecting the fifth rotational element with the tenth rotational element, a third clutch selectively connecting the fifth rotational element with the ninth rotational element, a fourth clutch selectively connecting the sixth rotational element with the seventh rotational element, a first brake selectively connecting the first rotational element to the transmission housing, and a second brake selectively connecting the ninth rotational element to the transmission housing.

The planetary gear train according to an embodiment of the present disclosure may achieve ten forward speed stages and one reverse speed stage by combining four planetary gear sets with six control elements.

In addition, the planetary gear train according to an embodiment of the present disclosure may achieve speed stages suitable to a rotational speed of the engine due to multiple-speed stages of the automatic transmission. Particularly, silent driving or noise reduction of the vehicle may be improved by using an operation point positioned at a low rotational speed region of an engine.

In addition, the planetary gear train according to an embodiment of the present disclosure may maximize driving efficiency of the engine and may improve power delivery, performance, and fuel consumption.

Other obtainable or predictable effects from the embodiments of the present disclosure will be explicitly or implicitly described in a DETAILED DESCRIPTION section. In other words, various effects predictable from embodiments of the present disclosure will be described below.

BRIEF DESCRIPTION OF THE DRAWINGS

FIG. 2 is an operation chart of control elements at each speed stage in the planetary gear train according to an embodiment of the present disclosure.

DETAILED DESCRIPTION OF THE EMBODIMENTS

Figure 1:
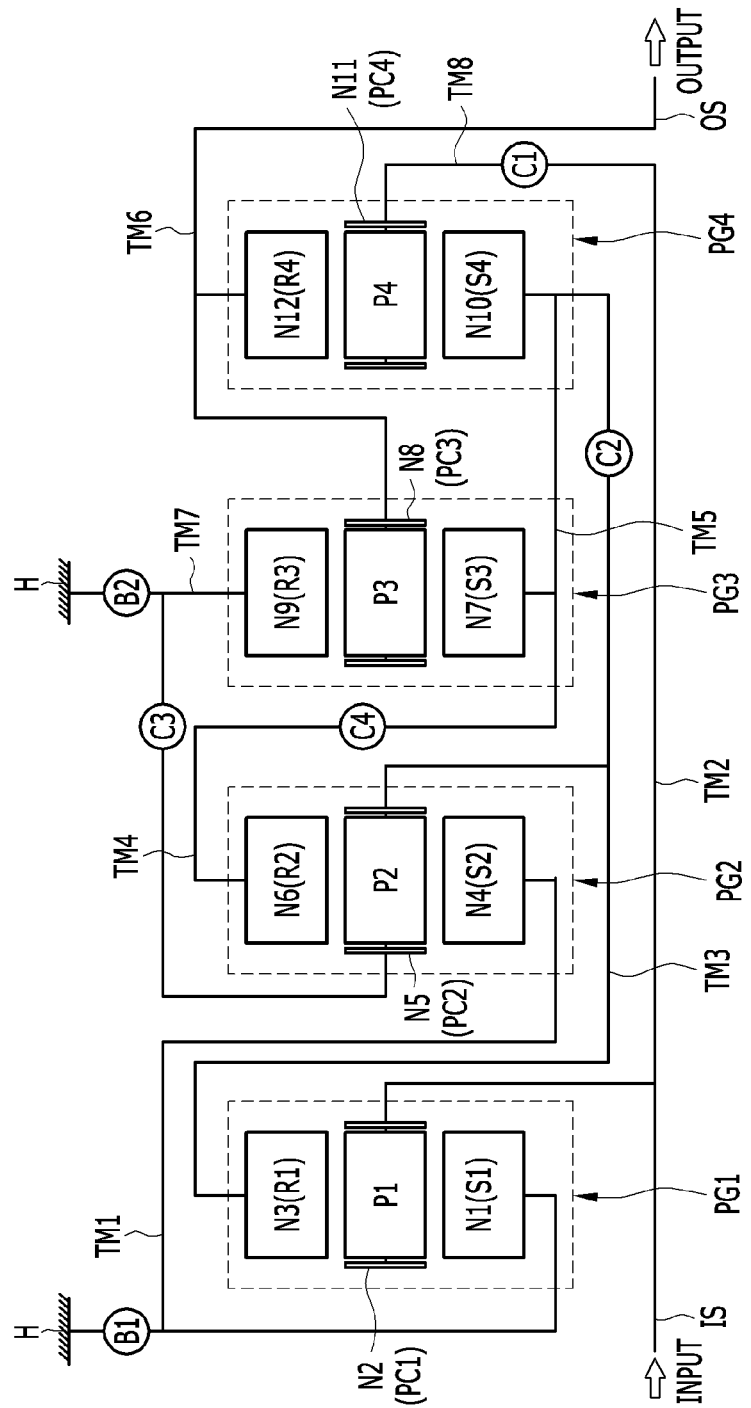
FIG. 1 is a schematic diagram of a planetary gear train according to an embodiment of the present disclosure.

It is desired to develop a planetary gear train which may achieve maximum efficiency with a small number of components which may increase fuel economy through the multiple-speeds. The disclosed planetary gear train may improve power delivery, performance, and fuel economy by achieving ten forward speed stages with a minimum number of constituent elements being used. The disclosed planetary gear train further improves silent driving or noise reduction of the vehicle by using an operation point positioned at a low engine speed.

Hereinafter, embodiments of the present disclosure will be described in detail with reference to the accompanying drawings. However, parts which are not related with the description are omitted for clearly describing the embodiments of the present disclosure and like reference numerals refer to like or similar elements throughout the specification. In the drawings, the following symbols are used to identify various elements of the disclosed embodiments, wherein:
  i) B1, B2: first and second brakes;
  ii) C1, C2, C3, C4: first, second, third, and fourth clutches;
  iii) PG1, PG2, PG3, PG4: first, second, third, and fourth planetary gear sets;
  iv) S1, S2, S3, S4: first, second, third, and fourth sun gears;
  v) PC1, PC2, PC3, PC4: first, second, third, and fourth planet carriers;
  vi) R1, R2, R3, R4: first, second, third, and fourth ring gears;
  vii) IS: input shaft;
  viii) OS: output shaft; and
  ix) TM1, TM2, TM3, TM4, TM5, TM6, TM7, TM8: first, second, third, fourth, fifth, sixth, seventh, and eighth shafts.

In the following description, using names or terms to identify components such as first, second, and the like is to differentiate the names because the names of the components are otherwise the same as each other. Such a naming convention is not intended to denote or set an order thereof and the disclosure is not intended to be so limited.

FIG. 1 is a schematic diagram of a planetary gear train according to an embodiment of the present disclosure.

Referring to FIG. 1, a planetary gear train according to an embodiment of the present disclosure includes first, second, third, and fourth planetary gear sets PG1, PG2, PG3, and PG4 disposed on the same axis. In one embodiment, the planetary gear train also includes, an input shaft IS, an output shaft OS; eight rotational shafts TM1-TM8 connected to at least one of rotational elements of the first, second, third, and fourth planetary gear sets PG1, PG2, PG3, and PG4; four clutches C1-C4 and two brakes B1 and B2 that are control elements; and a transmission housing H.

Torque input from the input shaft IS is changed by cooperation of the first, second, third, and fourth planetary gear sets PG1, PG2, PG3, and PG4 and the changed torque is output through the output shaft OS.

In this embodiment, the planetary gear sets are arranged in the order of first, second, third and fourth planetary gear sets, PG1, PG2, PG3 and PG4 from an engine side.

The input shaft IS is an input member. Torque from a crankshaft of an engine, after being torque-converted through a torque converter, is input into the input shaft IS.

The output shaft OS is an output member. The output shaft OS is disposed in parallel with the input shaft IS and transmits driving torque to a driving wheel through a differential apparatus.

In this embodiment, the first planetary gear set PG1 is a single pinion planetary gear set. The first planetary gear set PG1 includes a first sun gear S1, a first planet carrier PC1 rotatably supporting a first pinion P1 that is externally meshed with the first sun gear S1, and a first ring gear R1 that is internally meshed with the first pinion P1 respectively as first, second, and third rotational elements N1, N2, and N3.

In this embodiment, the second planetary gear set PG2 is a single pinion planetary gear set. The second planetary gear set PG2 includes a second sun gear S2, a second planet carrier PC2 rotatably supporting a second pinion P2 that is externally meshed with the second sun gear S2, and a second ring gear R2 that is internally meshed with the second pinion P2, respectively, as fourth, fifth, and sixth rotational elements N4, N5, and N6.

In this embodiment, the third planetary gear set PG3 is a single pinion planetary gear set. The third planetary gear set PG3 and includes a third sun gear S3, a third planet carrier PC3 rotatably supporting a third pinion P3 that is externally meshed with the third sun gear S3, and a third ring gear R3 that is internally meshed with the third pinion P3, respectively, as seventh, eighth, and ninth rotational elements N7, N8, and N9.

In this embodiment, the fourth planetary gear set PG4 is a single pinion planetary gear set. The fourth planetary gear set PG4 includes a fourth sun gear S4, a fourth planet carrier PC4 rotatably supporting a fourth pinion P4 that is externally meshed with the fourth sun gear S4, and a fourth ring gear R4 that is internally meshed with the fourth pinion P4, respectively, as tenth, eleventh, and twelfth rotational elements N10, N11, and N12.

In this embodiment, the first rotational element N1 and the tenth rotational element N10 are directly connected to each other. The second rotational element N2 and the fifth rotational element N5 are directly connected to each other. The fourth rotational element N4 and the twelfth rotational element N12 are directly connected to each other. Lastly, the sixth rotational element N6 and the seventh rotational element N7 are directly connected to each other. The first, the second, the third and the fourth planetary gear sets PG1, PG2, PG3 and PG4 include eight shafts TM1-TM8.

The eight shafts TM1-TM8 are described in further detail below.

In this embodiment, the eight shafts TM1-TM8 may be rotational members that directly connect a plurality of rotational elements among the rotational elements of the planetary gear sets PG1, PG2, PG3, and PG4 with each other or that are directly connected to any one rotational element of the planetary gear sets PG1, PG2, PG3, and PG4. The eight shafts TM1-TM8 rotate with the any one rotational element to transmit torque or may be fixed members that selectively or directly connect any one rotational element of the planetary gear sets PG1, PG2, PG3, and PG4 to the transmission housing H to fix the any one rotational element.

In this embodiment, the first shaft TM1 is connected to the first rotational element N1 (the first sun gear S1) and the fourth rotational element N4 (the second sun gear S2). The first shaft TM1 is also selectively connected to the transmission housing H to be operated as a selective fixed element.

In this embodiment, the second shaft TM2 is connected to the second rotational element N2 (the first ring gear R1). The second shaft TM2 is also directly connected to the input shaft IS.

In this embodiment, the third shaft TM3 connects the third rotational element N3 (the first planet carrier PC1) with the fifth rotational element N5 (the second planet carrier PC2).

In this embodiment, the fourth shaft TM4 is connected to the sixth rotational element N6 (the second ring gear R2).

In this embodiment, the fifth shaft TM5 connects the seventh rotational element N7 (the third sun gear S3) and the tenth rotational element N10 (the fourth sun gear S4). The fifth shaft TM5 is also selectively connected to the third shaft TM3 and the fourth shaft TM4.

In this embodiment, the sixth shaft TM6 connects the eighth rotational element N8 (the third planet carrier PC3) and the twelfth rotational element N12 (the fourth ring gear R4). The sixth shaft TM6 is also directly connected to the output shaft OS.

In this embodiment, the seventh shaft TM7 is connected to the ninth rotational element N9 (the third ring gear R3). The seventh shaft TM7 is also selectively connected to the third shaft TM3. The seventh shaft TM7 is also selectively connected to the transmission housing H.

In this embodiment, the eighth shaft TM8 is connected to the eleventh rotational element N11 (the fourth planet carrier PC4). The eighth shaft TM8 is also selectively connected the second shaft TM2. In this arrangement, the eighth shaft TM8 is also selectively connected to the second shaft TM2 connected with the input shaft IS and is operated as an input element.

In addition, in this embodiment, four clutches C1, C2, C3, and C4 are disposed at portions at which any two shafts among the eight shafts TM1-TM8 including the input shaft IS and the output shaft OS are selectively connected to each other.

In addition, in this embodiment, two brakes B1 and B2 are disposed at portions at which any one shaft among the eight shafts TM1-TM8 is selectively connected to the transmission housing H.

Arrangements of the four clutches C1-C4 and the two brakes B1 and B2 are described in detail below.

In this embodiment, the first clutch C1 is disposed between the first clutch C1, the second shaft TM2, and the eighth shaft TM8. The first clutch C1 selectively connects the second shaft TM2 and the eighth shaft TM8.

In this embodiment, the second clutch C2 is disposed between the third shaft TM3 and the fifth shaft TM5. The second clutch C2 selectively connects the third shaft TM3 with the fifth shaft TM5.

In this embodiment, the third clutch C3 is disposed between the third shaft TM3 and the seventh shaft TM7. The third clutch C3 selectively connects the third shaft TM3 with the seventh shaft TM7.

In this embodiment, the fourth clutch C4 is disposed between the fourth shaft TM4 and the fifth shaft TM5. The fourth clutch C4 selectively connects the fourth shaft TM4 with the fifth shaft TM5.

In this embodiment, the first brake B1 is disposed between the first shaft TM1 and the transmission housing H. The first brake B1 selectively connects the first shaft TM1 to the transmission housing H.

In this embodiment, the second brake B2 is disposed between the seventh shaft TM7 and the transmission housing H. The second brake B2 selectively connects seventh shaft TM7 to the transmission housing H.

The first clutch 01 selectively connects the second shaft TM2 with the eighth shaft TM8. The first clutch 01 also selectively connects the input shaft IS with the eighth shaft TM8 because the second shaft TM2 is connected to the input shaft IS as shown in FIG. 1.

The control elements including the first, second, third, and fourth clutches C1, C2, C3, and C4 and the first and second brakes B1 and B2 may be frictionally engaging units that are operated by hydraulic pressure. Particularly, the control elements may be, but not limited to, multi-plate friction elements of a wet type. However, the control elements may be engaging units that are operated by electrical signal, such as dog clutches, electric clutches, magnetic particle clutches, or the like.

FIG. 2 is an operation chart of the control elements at each speed stage in the planetary gear train according to an embodiment of the present disclosure.

As shown in FIG. 2, three control elements among the first, the second, the third, and the fourth clutches C1, C2, C3, and C4 and the first and the second brakes B1 and B2, all of which are control elements, are operated at each speed stage in the planetary gear train according to an embodiment of the present disclosure.

In this embodiment, the second brake B2 and the second and the fourth clutches C2 and C4 are simultaneously operated at a first forward speed shift-stage D1.

Torque of the input shaft IS is input to the second shaft TM2 in a state where the third shaft TM3 is connected with the fifth shaft TM5 by operation of the second clutch C2 and the fourth shaft TM4 is connected with the fifth shaft TM5 by operation of the fourth clutch C4.

In addition, the fifth shaft TM7 is operated as the fixed element by operation of the second brake B2. In this arrangement, the torque of the input shaft IS is shifted into the first forward speed stage D1 and the first forward speed stage D1 is output through the output shaft OS connected to the sixth shaft TM6.

In this embodiment, the first and the second brakes, B1 and B2 and the second clutch C2 are simultaneously operated at a second forward speed shift-stage D2.

Torque of the input shaft IS is input to the second shaft TM2, in a state that the third shaft TM3 is connected with the fifth shaft TM5 by operation of the second clutch C2. In addition, the first shaft TM1 and the seventh shaft TM7 are operated as the fixed elements by operation of the first and the second brakes, B1 and B2. Therefore, the torque of the input shaft IS is shifted into the second forward speed stage D1 and the second forward speed stage D2 is output through the output shaft OS connected to the sixth shaft TM6.

The first and the second brakes, B1 and B2 and the fourth clutch C4 are simultaneously operated at the third forward speed shift-stage D3.

Torque of the input shaft IS is input to the second shaft TM2, in a state where the fourth shaft TM4 is connected with the fifth shaft TM5 by operation of the fourth clutch C4. In addition, the first shaft TM1 and the seventh shaft TM7 are operated as the fixed elements by operation of the first and the second brakes, B1 and B2. In this arrangement, the torque of the input shaft IS is shifted into the third forward speed stage D3 and the third forward speed stage D3 is output through the output shaft OS connected to the sixth shaft TM6.

In this embodiment, the first and the second brakes B1 and B2 and the first clutch C1 are simultaneously operated at a fourth forward speed shift-stage D4.

Torque of the input shaft IS is input to the second shaft TM2 and the eighth shaft TM8 in a state where the second shaft TM2 is connected with the eighth shaft TM8 by operation of the first clutch C1. In addition, the first shaft TM1 and the seventh shaft TM7 are operated as the fixed elements by operation of the first and the second brakes, B1 and B2. Therefore, the torque of the input shaft IS is shifted into the fourth forward speed stage D4 and the fourth forward speed stage D4 is output through the output shaft OS connected to the sixth shaft TM6.

In this embodiment, any one clutch of the second, the third, and the fourth clutches, C2, C3, and C4 may be operated as alternating the first brake B1 to achieve the fourth forward speed stage D4.

In this embodiment, the first brake B1 and the first and the fourth clutches C1 and C4 are simultaneously operated at a fifth forward speed shift-stage D5.

Torque of the input shaft IS is input to the second shaft TM2 in a state where the second shaft TM2 is connected with the eighth shaft TM8 by operation of the first clutch C1 and the fourth shaft TM4 is connected with the fifth shaft TM5 by operation of the fourth clutch C4. In addition, the first shaft TM1 is operated as the fixed element by operation of the first brake B1. Therefore, the torque of the input shaft IS is shifted into the fifth forward speed stage D5, and the fifth forward speed stage D5 is output through the output shaft OS connected to the sixth shaft TM6.

In this embodiment, the first brake B1 and the first and the second clutches C1 and C2 are simultaneously operated at a sixth forward speed shift-stage D6.

Torque of the input shaft IS is input to the second shaft TM2 in a state where the second shaft TM2 is connected with the eighth shaft TM8 by operation of the first clutch 01 and the third shaft TM3 is connected with the fifth shaft TM5 by operation of the second clutch C2. In addition, the first shaft TM1 is operated as the fixed element by operation of the first brake B1. Therefore, the torque of the input shaft IS is shifted into the sixth forward speed stage D6 and the sixth forward speed stage D6 is output through the output shaft OS connected to the sixth shaft TM6.

In this embodiment, the first, the third, and the fourth clutches, C1, C3, and C4 are simultaneously operated at a seventh forward speed shift-stage D7.

Torque of the input shaft IS is input to the second shaft TM2 in a state where the second shaft TM2 is connected with the eighth shaft TM8 by operation of the first clutch C1, the third shaft TM3 is connected with the seventh shaft TM7 by operation of the third clutch C3 and the fourth shaft TM4 is connected with the fifth shaft TM5 by operation of the fourth clutch C4. In this case, the first, the second, the third, and the fourth planetary gear sets PG1, PG2, PG3, and PG4 become lock-up states. Therefore, the torque of the input shaft IS is shifted into the seventh forward speed stage D7 and the seventh forward speed stage D7 is output through the output shaft OS connected to the sixth shaft TM6.

Any three clutches of the first, the second, the third and the fourth clutches, C1, C2, C3 and C4 may be operated to achieve the seventh forward speed shift-stage D7.

In this embodiment, the first brake B1 and the first and the third clutches, C1 and C3 are simultaneously operated at an eighth forward speed shift-stage D8.

Torque of the input shaft IS is input to the second shaft TM2, in a state that the second shaft TM2 is connected with the eighth shaft TM8 by operation of the first clutch C1 and the third shaft TM3 is connected with the seventh shaft TM7 by operation of the third clutch C3. In addition, the first shaft TM1 is operated as the fixed element by operation of the first brake B1. Therefore, the torque of the input shaft IS is shifted into the eighth forward speed stage D8, and the eighth forward speed stage D8 is output through the output shaft OS connected to the sixth shaft TM6.

In this embodiment, the first brake B1 and the second and the third clutches C2 and C3 are simultaneously operated at a ninth forward speed shift-stage D9.

Torque of the input shaft IS is input to the second shaft TM2 in a state that the third shaft TM3 is connected with the fifth shaft TM5 by operation of the second clutch C2 and the third shaft TM3 is connected with the seventh shaft TM7 by operation of the third clutch C3. In addition, the first shaft TM1 is operated as the fixed element by operation of the first brake B1. Therefore, the torque of the input shaft IS is shifted into the ninth forward speed stage D9, and the ninth forward speed stage D9 is output through the output shaft OS connected to the sixth shaft TM6.

In this embodiment, the first brake B1 and the third and the fourth clutches C3 and C4 are simultaneously operated at a tenth forward speed shift-stage D10.

Torque of the input shaft IS is input to the second shaft TM2 in a state that the third shaft TM3 is connected with the seventh shaft TM7 by operation of the third clutch C3 and the fourth shaft TM4 is connected with the fifth shaft TM5 by operation of the fourth clutch C4. In addition, the first shaft TM1 is operated as the fixed element by operation of the first brake B1. Therefore, the torque of the input shaft IS is shifted into the tenth forward speed stage D10, and the tenth forward speed stage iD 10 s output through the output shaft OS connected to the sixth shaft TM6.

In this embodiment, the second brake B2 and the third and the fourth clutches C3 and C4 are simultaneously operated at a reverse speed REV.

Torque of the input shaft IS is input to the second shaft TM2 in a state that the third shaft TM3 is connected with the seventh shaft TM7 by operation of the third clutch C3 and the fourth shaft TM4 is connected with the fifth shaft TM5 by operation of the fourth clutch C4. In addition, the fifth shaft TM7 is operated as the fixed element by operation of the second brake B2. Therefore, the torque of the input shaft IS is shifted into the reverse speed stage REV, and the reverse speed stage REV is output through the output shaft OS connected to the sixth shaft TM6 as inverse rotational speed.

A planetary gear train according to an embodiment of the present disclosure may achieve at least ten forward speed stages and one reverse speed stage by combining four planetary gear sets, PG1, PG2, PG3, and PG4 with the four clutches, C1, C2, C3, and C4 and the two brakes B1 and B2.

In addition, the planetary gear train according to an embodiment of the present disclosure may achieve suitable speed stages according to the rotational speed of the engine. Particularly, silent driving or noise reduction of the vehicle may be improved by using an operation point positioned at a low rotational speed region of the engine.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A planetary gear train of an automatic transmission for a vehicle, the planetary gear comprising:
an input shaft receiving torque of an engine;
an output shaft outputting an output torque;
a first planetary gear set including first, second, and third rotational elements;
a second planetary gear set including fourth, fifth, and sixth rotational elements;
a third planetary gear set including seventh, eighth, and ninth rotational elements;
a fourth planetary gear set including tenth, eleventh, and twelfth rotational elements;
a first shaft connecting the first rotational element and the fourth rotational element;
a second shaft connected with the second rotational element and connected with the input shaft;
a third shaft connecting the third rotational element with the fifth rotational element;
a fourth shaft connected with the sixth rotational element;
a fifth shaft connecting the seventh rotational element with the tenth rotational element and selectively connected with the third shaft and the fourth shaft;
a sixth shaft connecting the eighth rotational element with the twelfth rotational element and connected with the output shaft;
a seventh shaft connected with the ninth rotational element and selectively connected with the third shaft; and
an eighth shaft connected with the eleventh rotational element and selectively connected with the second shaft.

2. The planetary gear train of claim 1, wherein each of the first shaft and the seventh shaft is selectively connectable to a transmission housing.

3. The planetary gear train of claim 1, wherein:
the first, second, and third rotational elements of the first planetary gear set are a first sun gear, a first planet carrier, and a first ring gear;
the fourth, fifth, and sixth rotational elements of the second planetary gear set are a second sun gear, a second planet carrier, and a second ring gear;
the seventh, eighth, and ninth rotational elements of the third planetary gear set are a third sun gear, a third planet carrier, and a third ring gear; and
the tenth, eleventh, and twelfth rotational elements of the fourth planetary gear set are a fourth sun gear, a fourth planet carrier, and a fourth ring gear, respectively.

4. The planetary gear train of claim 2, further comprising:
a first clutch selectively connecting the second shaft with the eighth shaft;
a second clutch selectively connecting the third shaft with the fifth shaft;
a third clutch selectively connecting the third shaft with the seventh shaft;
a fourth clutch selectively connecting the fourth shaft with the fifth shaft;
a first brake selectively connecting the first shaft to the transmission housing; and
a second brake selectively connecting the seventh shaft to the transmission housing.

5. A planetary gear train of an automatic transmission for a vehicle, the planetary gear comprising:
an input shaft receiving torque of an engine;
an output shaft outputting an output torque;
a first planetary gear set including first, second, and third rotational elements;
a second planetary gear set including fourth, fifth, and sixth rotational elements;
a third planetary gear set including seventh, eighth, and ninth rotational elements; and
a fourth planetary gear set including tenth, eleventh, and twelfth rotational elements,
wherein the input shaft is connected to the second rotational element,
the output shaft is connected to the twelfth rotational element,
the first rotational element is connected with the fourth rotational element,
the third rotational element is connected with the fifth rotational element,
the seventh rotational element is connected with the tenth rotational element and is selectively connected with the fifth rotational element and the sixth rotational element,
the eighth rotational element is connected with the twelfth rotational element,
the ninth rotational element is selectively connected with the fifth rotational element, and the eleventh rotational element is selectively connected with the second rotational element.

6. The planetary gear train of claim 5, wherein each of the first rotational element and the ninth rotational element is selectively connectable to a transmission housing.

7. The planetary gear train of claim 5, wherein:
the first, second, and third rotational elements of the first planetary gear set are a first sun gear, a first planet carrier, and a first ring gear;
the fourth, fifth, and sixth rotational elements of the second planetary gear set are a second sun gear, a second planet carrier, and a second ring gear;
the seventh, eighth, and ninth rotational elements of the third planetary gear set are a third sun gear, a third planet carrier, and a third ring gear; and
the tenth, eleventh, and twelfth rotational elements of the fourth planetary gear set are a fourth sun gear, a fourth planet carrier, and a fourth ring gear, respectively.

8. The planetary gear train of claim 6, further comprising:
a first clutch selectively connecting the second rotational element with the eleventh rotational element;
a second clutch selectively connecting the fifth rotational element with the tenth rotational element;
a third clutch selectively connecting the fifth rotational element with the ninth rotational element;
a fourth clutch selectively connecting the sixth rotational element with the seventh rotational element;
a first brake selectively connecting the first rotational element to the transmission housing; and
a second brake selectively connecting the ninth rotational element to the transmission housing.

* * * * *